(12) United States Patent
Berg

(10) Patent No.: US 6,321,603 B1
(45) Date of Patent: Nov. 27, 2001

(54) PRESSURE SENSOR

(75) Inventor: Arne Berg, Kattem (NO)

(73) Assignee: Optoplan AS, Trondheim (NO)

( * ) Notice: Subject to any disclaimer, the term of this patent is extended or adjusted under 35 U.S.C. 154(b) by 0 days.

(21) Appl. No.: 09/446,134

(22) PCT Filed: Jun. 8, 1998

(86) PCT No.: PCT/NO98/00173

§ 371 Date: Mar. 29, 2000

§ 102(e) Date: Mar. 29, 2000

(87) PCT Pub. No.: WO99/00653

PCT Pub. Date: Jan. 7, 1999

(30) Foreign Application Priority Data

Jun. 30, 1997 (NO) ...................................... 973038

(51) Int. Cl.[7] .................................. G01L 9/00; G01D 5/34
(52) U.S. Cl. .......................................... 73/705; 250/231.19
(58) Field of Search ............................ 73/705 OR, 708, 73/734, 736; 250/227.23, 227.14, 231.19 R, 227.21; 385/12, 13, 37

(56) References Cited

U.S. PATENT DOCUMENTS

| 4,670,649 | * | 6/1987 | Senior et al. | 250/227 |
| 4,911,015 | * | 3/1990 | Miller | 73/705 |
| 5,146,083 | * | 9/1992 | Zuckerwar et al. | 250/227.21 |
| 5,877,426 | * | 3/1999 | Hay et al. | 73/733 |
| 6,016,702 | * | 1/2000 | Maron | 73/705 |
| 6,122,971 | * | 9/2000 | Wlodarczyk | 73/705 |

* cited by examiner

Primary Examiner—William Oen
Assistant Examiner—Abdullahi Aw-Musse
(74) Attorney, Agent, or Firm—Dennison, Scheiner, Schultz & Wakeman

(57) ABSTRACT

A device (100) for measurement of pressure in fluids is disclosed that includes a cylindrical housing (101) having a pressure port (103), an inner cavity (102) and an opening (102b). A closed pipe (131) is situated in the cavity (102) and closes the opening (102b) in the housing (101) and establishes a cavity (134) between the pipe (131) and the inner wall of the housing (101). A connection element (133) is situated in the pipe (131), so that one end of the element (133) is connected to the free end of the pipe (131) for transfer of axial length change of the pipe (131), whereas the connected element (133) is arranged for establishing a cavity (132) between the connection element (133) and the pipe (131). An optical fiber (171) is laid in a slot (171) in the external surface of the housing (101), and includes a Bragg grating (150) fixed between the housing (101) and the connection organ (133) by fastening points (151, 152). Pressure induced expansion of the pipe (131) is transferred to the Bragg grating (150).

13 Claims, 3 Drawing Sheets

PRESSURE SENSOR

Figure 1:
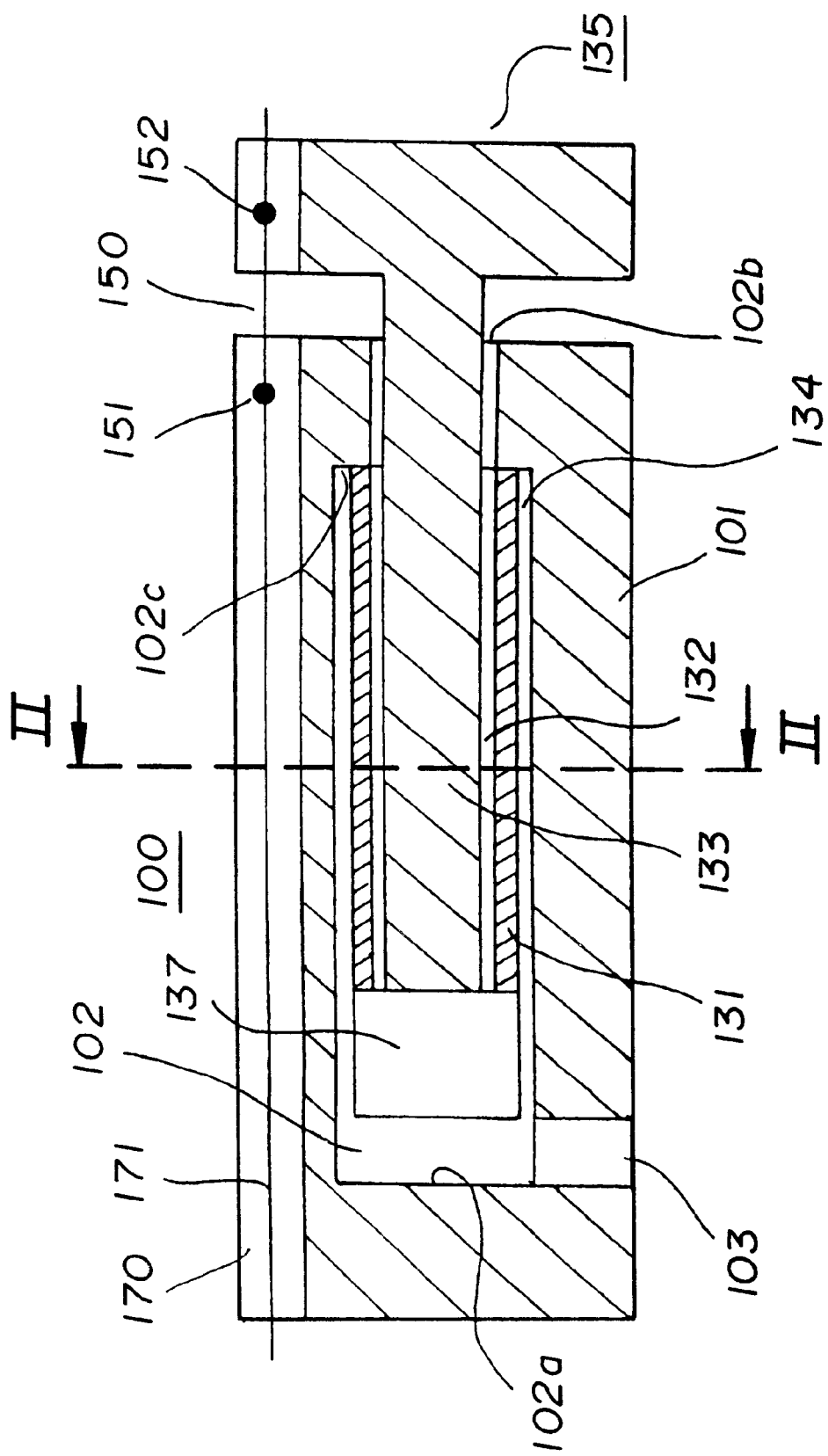

The invention concerns a device for registration of pressure, as stated in the introductory part of claim 1.

BACKGROUND

The invention is based on the principle of using a fiber-optical Bragg grating. A Bragg grating is a single mode fibre with a periodical variation in the refraction index over a fibre length of, for example 0.1 to 10 cm. Variation in refraction index is established by illumination of the fibre with an UV-laser. A Bragg grating reflects light by means of a wave length given by the refraction index and the spatial period to the variation of the refraction index (the grating period). Tension in the fibre or temperature will thus give a change of the wave length of the light of the Bragg grating.

In practical use, temperatures in the range −100° C. to +250° C. can be measured at about 20 points along a fiber having a length up to 50–100 km. Using various multiplexing techniques, the number of measuring points can be expanded. Examples of utilization areas are monitoring temperature in power lines, pipelines, transformers, engines, and in industrial processes.

U.S. Pat. No. 5,042,898 describes a temperature compensated Bragg-filter device, where a fiber section having a Bragg grating is mounted between two connected tension means in the filter device. The respective tension devices have different thermal coefficient of expansion and, because of the different temperature dependant expansion of the filter device in the longitudinal direction of the fiber, a relaxation will be established in the tensioned fiber section containing the Bragg grating when there is a rise in temperature. Correspondingly a tension is established at the fiber section with the Bragg grating when then is a temperature decrease. In this way changes are balanced in the wave length as a function of the temperature. An example of use of this known device is wavelength standard.

A number of devices exist for measurement of pressure in fluids. In particular, areas where there is narrow spatial accessibility, high temperature or high pressure, etc. However, the known devices for measuring pressure have disadvantages. For example, to measure pressure in wells, pressure sensors are presently used with a number of electronic components, which in these environments often have low reliability. Besides which, in wells there is often very little space available for installation of additional components, such as pressure sensors. Another example is monitoring of attenuations with electronically based pressure sensors. It has been known for lightning to make the electronics passive and put the pressure monitoring out of order.

Thus, there exists a need for a pressure sensor having mainly passive components and that can be used in stringent environments and confined spaces.

OBJECT

It is an object for the invention to provide a device for registration of pressure which meets the above identified need.

THE INVENTION

This object is achieved with a device according to the characterizing part of claim 1. Other features are clear from the dependent claims.

The invention concerns a device for measurement of pressure in fluids, henceforth denoted a pressure sensor.

The pressure sensor is generally characterized by a section of an optical fiber containing a Bragg grating in tension at a first point to a first means for being exposed to a first fluid pressure, and at a second point to a second means for being exposed to a second fluid pressure, in which the second means is connected to the first means and is provided for allowing reversible deformation at the second means as a function of differential pressure, and in this way exert axial tension or relief in the Bragg grating.

This fundamental structure of a pressure sensor makes it possible to manufacture very small pressure sensors with a very wide measurement range which are able to be installed in remote locations. Furthermore, the device makes it possible to measure pressure in a number of positions along the same optical fiber.

The expression "fluid" is defined as flow media generally, e.g. gas, liquid, suspensions, dispersion, emulsion, etc.

The invention is described in more detail by the accompanying drawings, where

Figure 2:
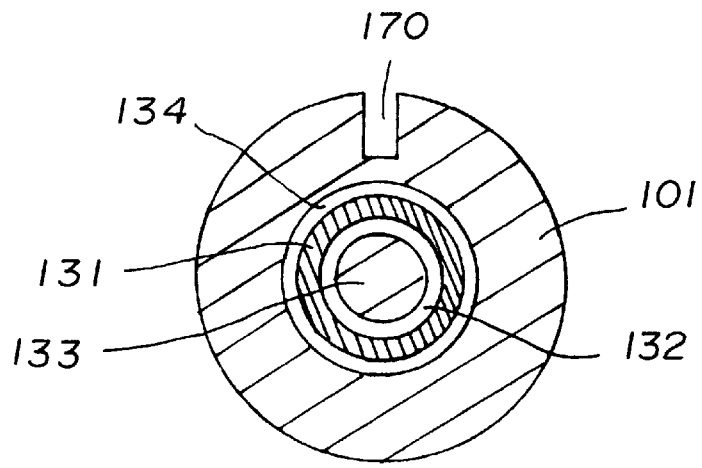
Figure 3A:
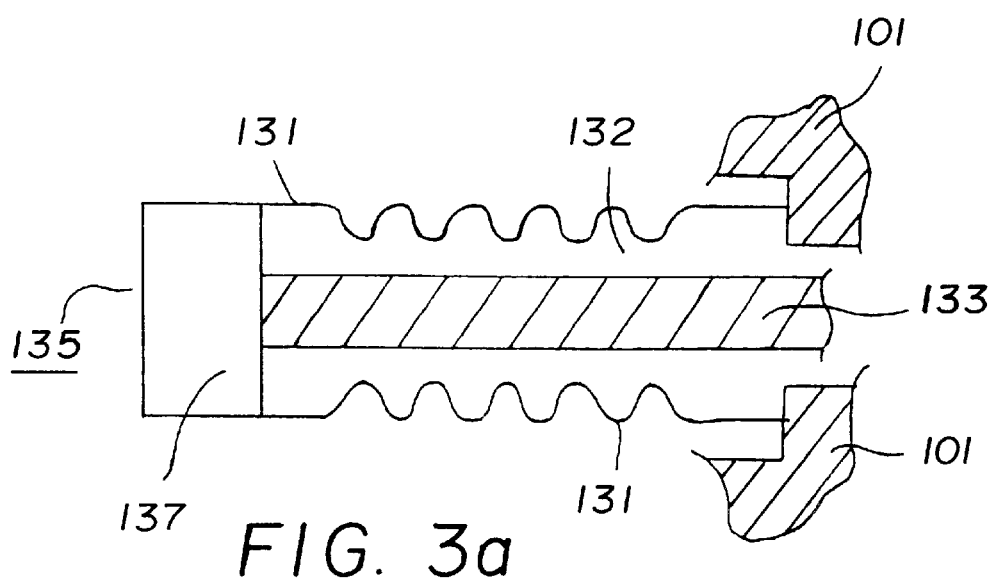
Figure 3B:
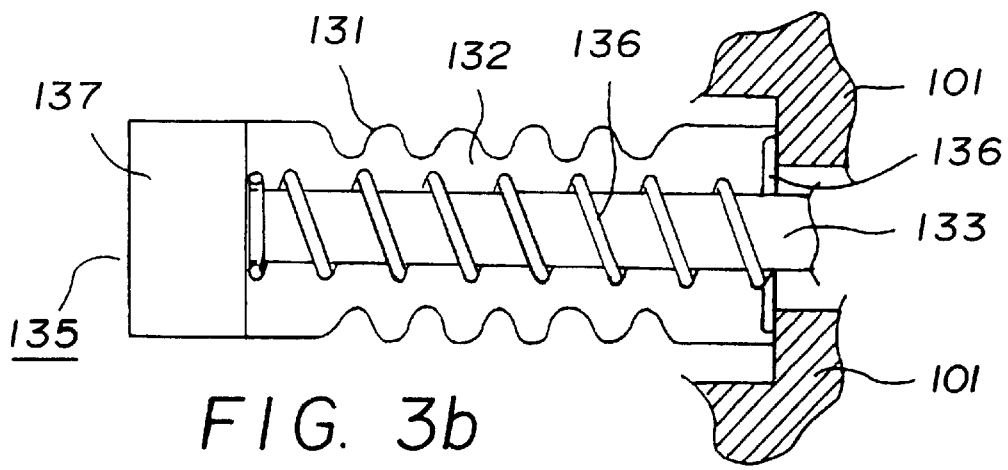
Figure 4:
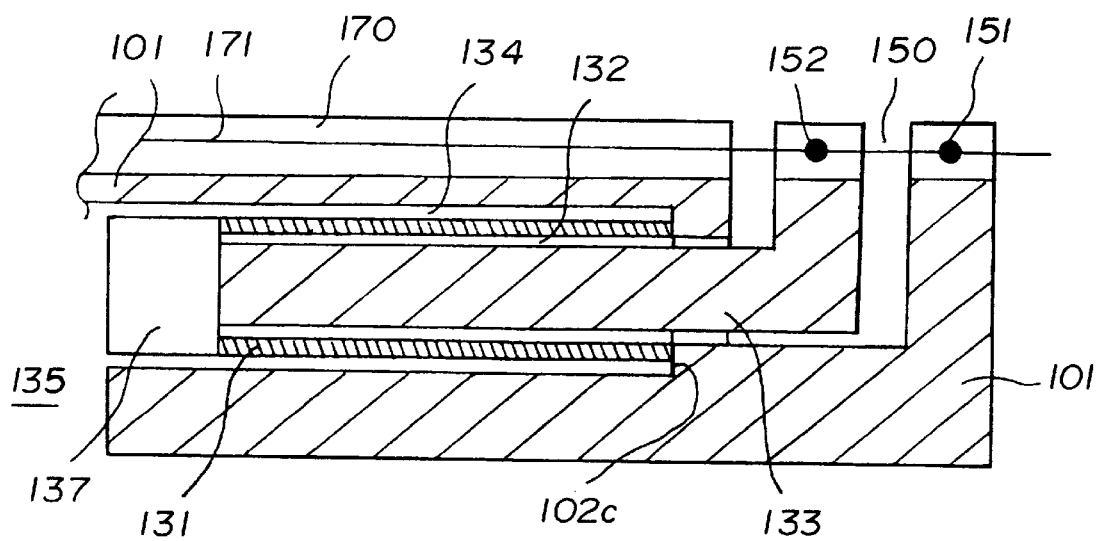

FIG. 1 shows a schematic, axial section view of an example of a device according to the invention, for registration of pressure in fluids, FIG. 2 shows a cross section view of the device illustrated in FIG. 1, along the line II—II, FIGS. 3a and 3b show schematically alternative embodiments of the pressure means, and FIG. 4 shows schematically an alternative embodiment of the device according to the invention, having a manner of operation that is complementary of the one shown in FIG. 1.

FIG. 1 shows a first embodiment of a pressure sensor according to the invention, generally denoted 100. The pressure sensor comprises a generally cylindrical housing 101 having an inner cylindrical cavity 102 with an end wall 102a. The inner cylindrical cavity 102 is here formed with a stepping or shoulder 102c, which gives a narrowing of the diameter of the cavity 102 in a region 102b, and serves as a landing shoulder for a pressure influenced means 135, as described in more detail below. Furthermore, the cavity 102 is provided with a port/opening 103 that communicates with the medium in which the pressure should be measured, either directly or via a conduit, or the like (not shown).

In the external periphery of the housing 101 is formed a longitudinal slot 170 (best seen in FIG. 2) for accommodation of an optical fiber 171. A Bragg grating in the optical fiber is indicated by 150 and is tensioned between two fastening points 151 and 152 to the cylindrical housing 101 and the pressure influenced means 135, respectively.

The pressure influenced means 135 comprises a generally cylindrical connection means 133 which is accommodated in a pressure influenced pipe 131 or corresponding. The external diameter of the connection means 133 is less than the inner diameter of the pressure influenced pipe 131 and establishes such a cavity or annulus 132 there between. This makes it possible for independent mutual axial movement between the pressure influenced pipe and the connection means. The external periphery of the pressure influenced means 131 is also less than the inner diameter of the cavity 132, so that a cavity 134 is established therebetween. In this way, the pressure influenced pipe is allowed to be compressed/tensioned independently of the housing 101. The pressure influenced pipe 131 is closed at one end with a lid 137 having a relatively thick wall, which again is fixed to the connection means 133 for transmission of axial expansion or contraction in the pressure influenced pipe 131 over to the connection means 133. The other end of the pressure influenced pipe 131 bears against, and is fluid tight connected with, the shoulder 102c in the cylindrical cavity 102, so that the cylindrical cavity 102 in the housing 101 is in fluid communication with the environment only through the port/opening 103.

FIG. 2 shows the device in FIG. 1 in a section view along the line II—II in FIG. 1. The cylindrical housing 101, the pressure influenced pipe 131, the connection means 133 (with the cavity 132 therebetween), and the cavity 134 between the housing 101 and the pressure influenced pipe 131 are indicated. As is clear from FIG. 2, the slot 170 is formed in the external periphery of the housing 101, which in use will be covered by an external lid or corresponding (not shown). In an alternative embodiment, a channel or corresponding could be formed, for introduction of the optical fiber.

The specific change in length of the pressure influenced pipe 131 can be expressed with the following equation:

$$\varepsilon_R = \frac{\Delta L_R}{L_R} = \frac{P \cdot R_R}{2 t_R \cdot E_R}$$

Where $\Delta L_R$ is the length change of the pipe 131, P is the absolute pressure of the medium, $R_R$ is the radius of the pipe 31, $t_R$ is the wall thickness of the pipe 31, and $E_R$ is the modulus of elasticity of the pipe. As is clear from the equation above, the specific expansion/compression of the pipe 131 will increase with increasing medium pressure P and with increasing ratio between the radius $R_R$ and the thickness $t_R$ of the pipe.

As the real expansion of the pipe 131 is the same as the expansion of the Bragg grating 150 between the fastening points 151 and 152, the specific expansion $\varepsilon_G$ of the grating 150 can be expressed with the following equation:

$$\varepsilon_G = \frac{L_R}{L_G} \cdot \varepsilon_R$$

where $L_R$ is the length of the pipe 131, $L_G$ is the length of the Bragg grating 150, and $\varepsilon_R$ is the specific expansion of the pipe 131 defined in the equation above. It can be seen that an amplification of the grating expansion $\varepsilon_R$ will be achieved by increasing the ratio between pipe length $L_R$ and grating length $L_G$.

In one embodiment, the device is completely constructed from metal, naturally with exception of the optical fiber. The wall thickness treadmill and the radius R of the pressure influenced pipe will vary according to which pressure area in which the measurement is performed, and the mechanical properties of the pipe material. For the measurement of pressure in the area 100 to 1000 bar, the ratio between wall thickness and the radius R of the pressure influated pipe will be in the area 0,1–0,3 for a steel pipe.

In use, the port 103 will be connected to, for example, a pressure gas tank (not shown) via a suitable connection, with the pressure sensor 100 located outside of the pressure container in, for example, atmospherical conditions. The gas pressure from the container is transferred to the cavity 102 of the housing 101 and exerts pressure both in axial direction and in radial direction of the pressure influenced pipe 131, but since only one end surface of the pipe 131 is exerted for gas pressure, the net pressure will be exerted axially on the pipe 131 and produce a compression or expansion of the pipe 131, dependant upon the differential pressure against the environmental pressure outside the pressure sensor. Compression or expansion in the pipe 131 will thus be transferred to the connection means 133 that again will transfer tension and relaxation, respectively in the Bragg grating 150, and give a change in the wavelength for light reflected by the Bragg grating. This change is registered in a measuring gauge (not shown) which gives a corresponding view of the pressure at the port 103.

In order to compensate for temperature conditional displacement in the wavelength in light reflected from the Bragg grating which primarily is caused by change in the refraction index of the fiber material as a direct function of change in temperature, a reference grating (Bragg grating) can be established in a position by the housing 101 that is not exposed to a mechanical strain as a function of pressure. The device may then be calibrated at different temperatures in order to achieve the best possible temperature independent measurement of the displacement in the wavelength as a function of the medium pressure. In order to increase the accuracy further, the connection means 133 can be formed from at least two different materials, each with a different thermal expansion coefficient in order to equalize temperature induced strain of the Bragg grating caused by temperature induced mechanical tension/compression in the accompanying sensor components. Accordingly, as an example, the pipe 131 and the half part of the connection means 133 that is connected to the end of the pipe 131 can be formed in steel, while the rest of the connection means, out to the fastening point 152 for the optical fiber, can be formed in glass.

FIGS. 3a and 3b show alternative embodiments of the pressure influenced means 135 with a section of the housing 101. In these embodiments, the pipe in the pressure influenced pipe is replaced with a bellow-shaped pipe 131 having a greater compressibility axially then radially. For average to low pressure, a metal bellows 131 can be used, and for low pressures, a bellows of a more flexible material, such as polymer or rubber, can be used.

As is clear from FIG. 3b, if required, a larger axial rigidity can be established in the bellows, by means of a spring means 136 fixed between the closed end of the pressure influenced means 135 and a second shoulder/step in the housing 101 by the opening that contains the connection means 133. In this way, a pressure sensor can be provided, for use in a broad pressure range and with varying enforcement.

FIG. 4 shows a device according to the invention with a complementary function to the one illustrated in FIG. 1, and shows the housing 101, the pressure influenced means 135 and an optical fiber 171 sunk in a recess 170 in the housing 101 and connected to the pressure influated means 135 at 152. However, in this embodiment the connection point 151 of the fiber to the housing 101 is situated at the opposite side of the connection point 152 to the pressure influenced means 135, compared to the embodiment illustrated in FIG. 1. Accordingly, a compression of the pressure influated pipe 131 will give a relaxation of the Bragg grating 150 between the fastening points 151 and 152. This embodiment is favourable in some applications, for example where the device is exposed to large variations in the pressure, and is expected to have a longer servicelife.

From the description above it should be clear for a person skilled in the art that the different components do not necessarily have to have the geometry that is illustrated in the drawings. Accordingly, the pressure influenced means can have a section geometry that is not circular, for example elliptical, rectangular, etc. The same applies to the other components. The central aspect of the invention is, however, that the pressure influenced means shall transfer, for example tension over to the connection means and further to the connected Bragg grating.

Thus, the invention provides a device for measurement of pressure in fluids, which allows for measurement over a broad range of differential pressure and with high accuracy and simultaneously compensates for deviations in measurement as a function of changes in temperature. The device according to the invention can also be formed with a very small dimensions and can thus be installed in positions that normally do not allow for measurement of pressure in medium pressure or differential pressure. A further advantage with the device according to the invention is that the fiber is not exposed to pressure, and will therefore provide a large degree of reliability. This embodiment makes it unecessary to use pressure tight connections for the fiber.

What is claimed is:

1. Device (100) for measurement of pressure in fluids, characterized by a section of optical fiber (171) containing a Bragg grating (150) wherein said Bragg grating is fixed at a first point (151) to a first means (101) for exposure to a first fluid pressure, and fixed at a second point (152) to a second means (135) for exposure to a second fluid pressure, so that the second means (135) is connected to the first means (101) and is formed for allowing reversible deformation by the second means (135) as a function of differential pressure, and in that way exert axial tension or relaxation in the Bragg grating (150).

2. Device according to claim 1, characterized in that the first means is a substantially cylindrical housing (101) formed with a substantially cylindrical cavity (102) and an opening (103) that allows fluid communication between said second fluid pressure and the cavity (102), the second means including:

a closed, substantially cylindrical member (131) situated in said cylindrical cavity (102) and exhibiting a first free end closed against the cavity (102) with a lid, bottom or corresponding (137), and a second end fixed to the first means (101), a connection element (133) fixed to the bottom (137) of the cylindrical member (131) for transfer of lengthwise compression or lengthwise tension of the cylindrical member (131) to the second fastening point on the optical fiber section.

3. Device according to claim 2, characterized in that a first part of the connection element (133) is formed by a material having an neglectable thermal expansion coefficient and a second part thereof is formed by a material having a larger thermal expansion coefficient.

4. Device according to claim 1, characterized in that the optical fiber (171) is situated in a slot (170) formed in the external periphery of the first means (101).

5. Device according to claim 2, characterized in that the cylindrical member (131) is a metallic pipe having a relatively low ratio between wall thickness and pipe diameter.

6. Device according to claim 2, characterized in that the cylindrical member (131) is a substantially cylindrical bellows shape with a large compressability axially then radially.

7. Device according to claim 6, characterized in that the bellows is formed by metal for use in media with average to low pressure.

8. Device according to claim 6, characterized in that the bellows is formed by polymer or rubber for use in media with low pressure.

9. Device according to claim 6, characterized in that the bellows (131) is pretensioned by a spring means (136).

10. Device according to claim 2, characterized in that the optical fiber (171) is situated in a slot (170) formed in the external periphery of the first means (101) and in the length direction thereof.

11. Device according to claim 3, characterized in that the optical fiber (171) is situated in a slot (170) formed in the external periphery of the first means (101) and in the length direction thereof.

12. Device according to claim 3, characterized in that the cylindrical member (131) is a metallic pipe having a relatively low ratio between wall thickness and pipe diameter.

13. Device according to claim 7 characterized in that the bellows (131) is pretensioned by a spring means (136).

* * * * *